Nov. 5, 1957  T. T. KEANE, SR., ET AL  2,812,260
IMPROVED METHOD OF TREATING MEAT
Filed Oct. 22, 1954
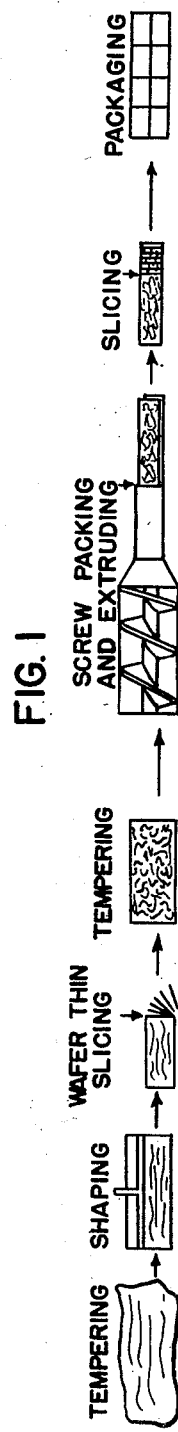
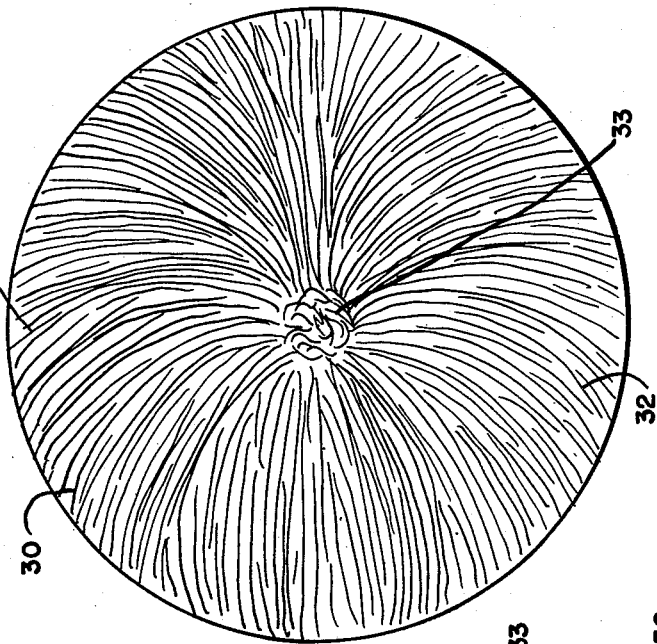
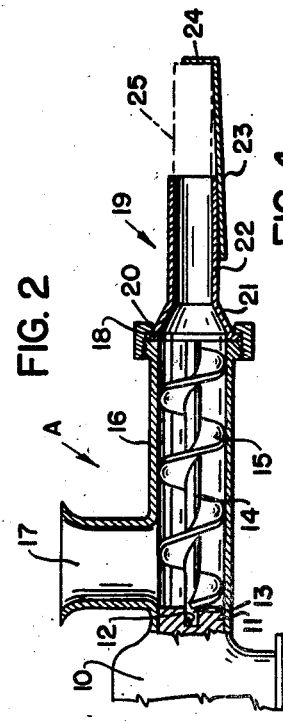
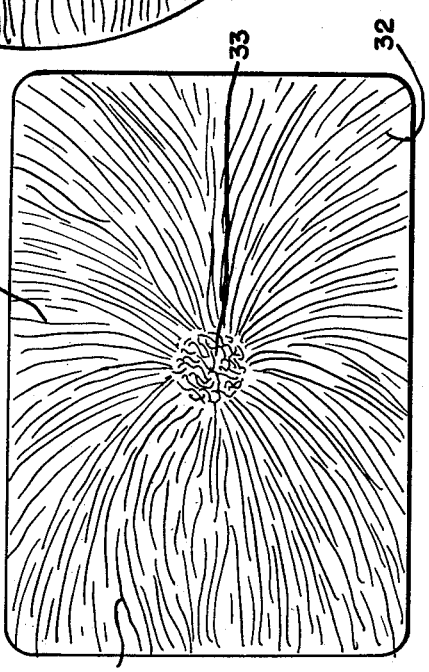
INVENTORS.
Thomas T. Keane Sr.
Michael A. Keane II
Thomas T. Keane Jr.
BY
ATTORNEY United States Patent Office 2,812,260
Patented Nov. 5, 1957

2,812,260

IMPROVED METHOD OF TREATING MEAT

Thomas T. Keane, Sr., and Michael A. Keane II, Washington, D. C., and Thomas T. Keane, Jr., Silver Spring, Md., assignors to T. T. Keane Company, Inc., Washington, D. C., a corporation of Delaware Application October 22, 1954, Serial No. 463,956

10 Claims. (Cl. 99—194)

This invention relates to an improved method of treating meat.

An object of this invention is to provide an improved method of treating meat whereby the meat is formed into a cohesive loaf or patties that will not disintegrate or separate when broiled, stewed, boiled, or fried, or, when cooked under any normal and usual cooking conditions.

Another object of this invention is to provide an improved method of treating meat whereby the meat is formed into a cohesive loaf or patties and wherein the cohesiveness is obtained by means of a twisted interlocking of thin slices of meat without comminuting or tearing them.

A further object of this invention is to provide an improved method for treating and preparing meat that assures a high rate of production of a meat product with a minimum of waste and a minimum amount of supervision, resulting in lower production costs.

A still further object of this invention is to provide an improved method for treating and preparing raw meat wherein the meat remains in a frozen state throughout its entire processing, assuring the preservation in the meat of all of its natural juices and flavors, assuring freshness, the natural taste of the meat used, and so processed as to prevent spoilage.

Other objects and advantages of this invention will be apparent during the course of the following detailed description.

In the accompanying drawing, forming a part of this specification and wherein similar reference characters designate corresponding parts throughout the several views:

Fig. 1 is a flow chart showing the preferred sequence of steps in the method of making the improved meat product.

Fig. 2 is a view, partly in section, of mechanism used for interlocking meat slices and extrusion of the same in loaf form.

Fig. 3 is a plan view of one form of improved meat product extruded through a cylindrical shaped mold showing the approximate lined relation of slices used in forming the same.

Fig. 4 is a view of another shape of the improved meat product, extruded through a rectangular mold.

In producing our improved meat product a boneless cut of raw meat, preferably beef or veal, is selected, such as round less the shank, sirloin-butt or hip, loin less the flank, rib eye or roll, and boneless square cut chuck. It is customary to purchase such cuts of meat in frozen state, or have them stored in frozen condition prior to processing, so that the temperature of said cuts will usually be well below zero degrees (0°) Fahrenheit. Meats other than beef or veal may be used if so desired.

These frozen cuts of raw meat are then placed under controlled refrigeration and tempered until the temperature at the center of each piece is such that the meat will remain frozen during processing under such conditions that it can be mold shaped by pressure to a size that will fit the carriage of slicing equipment. Such pressure also enables ice crystals that have formed in the meat to rupture the cell structure of the meat. This shaping could be done prior to the original freezing of the meat, but then the ice crystals would not be present to rupture the cell structure of the meat, resulting in a somewhat less succulent finished product. It has also been found that savings are effected through handling and labor by purchasing non-uniform cuts of frozen meat at a lower price, and shaping while still frozen.

We have found that these non-uniform cuts of meat should be tampered so that the center temperature of each cut is between twenty degrees (20°) F. to twenty six degrees (26°) F. These cuts can then be shaped in conventional hydraulic molds utilizing a pressure of approximately 2,000 p. s. i. We have also found that a molded loaf of approximately three (3") inches by four and one quarter (4¼") inches is an ideal size from which slices can be cut so as to give maximum body and cohesiveness to the final product.

Suitable lengths of the thus molded meat are then placed in slicing equipment and wafer thin slices are cut. They are all of the same thickness. This thickness may vary between one hundred twenty eighth (1/128) of an inch to one thirty second (1/32) of an inch, dependent on the type of meat used. The slices fall into a bin or container in rather haphazard manner resulting in an overlapping, sometimes folding and staggered layering. The wafer thin slicing should not be accomplished at a temperature of more than thirty two degrees (32°) Fahrenheit as the meat will have a tendency to tear rather than cleanly slice. Lower temperature limits may be determined by the type and size of slicing equipment used. We have found that the ideal temperature range for conventional slicing equipment is between twenty degrees (20°) F. and twenty six (26°) F. The optimum temperature is twenty two degrees (22°) Fehrenheit or a very slightly higher temperature which naturally results from the shaping of the cut of meat under pressure, when the said cut of meat is shaped at twenty two degrees (22°) Fehrenheit.

We have found that the combination of pressure, slicing, and resultant handling of the meat will raise the temperature of the slices approximately four degrees (4°) Fahrenheit. Therefore we place the slices in the receiving container under controlled refrigeration for re-tempering or re-chilling to a temperature of between twenty degrees (20°) F. and twenty six degrees (26°) F.; twenty four degrees (24°) F. being the optimum temperature.

When the wafer thin slices in the bin or container have reached the desired temperature they are then fed into a spiral screw packing and extruding machine.

This spiral screw packing and extruding machine resembles a conventional meat grinder with changes and modifications so that it no longer grinds or comminutes the meat but exerts an interlocking spiral and circular twisting force upon the slices and extrudes then through a reduced outlet. The screw packing and extruding machine A may comprise a motor 10 having a driving wheel 11. The latter has a squared opening 12 into which the squared end 13 of a worm shaft 14 is detachably socketed. The spiral worm or blade 15 is supported by slidable contact with the inner wall surface of an elongated, preferably cylindrical casing 16. A hopper 17 is provided at the top of the casing 16 into which the slices are fed. Affixed to one end of the casing 16, by a screw threaded nut ring 18 is an extrusion die 19. It has a flange 20 at one end thereof which is seal pressed against the casing 16 by the nut ring 18, thus securing the die 19 in place. The die 19 is tapered convergently at 21 from flange 20 for a short distance and thence straightens into a reduced tube 22, either circular or rectangular in cross section, depending upon the shape of the finished product desired. A receiving trough or container 23 is provided at the outlet of the die 19, having an upturned flange or wall 24. This receiving bin or container 23 receives the extruded loaf 25. It is held at the outlet end of the tube 19 in any approved manner, manually or otherwise and slid outwardly therefrom as the loaf 25 is extruded and presses against the upturned flange or wall 24. The shaft 14 rides freely within the casing 16, with the squared end thereof held firmly in the squared opening 12 of the driving wheel 11 by back pressure of the meat against the blade 15 and resistance of the meat to being forced through the extruding die.

The wafer thin slices are fed from the bin or container in to which they have been sliced enmass into the hopper 17 in substantially the haphazard folded and staggered and eccentric overlapping manner in which they fell as sliced. The tempering after slicing results in an increased cohesion of these folded, overlapped and intertwined wafer thin slices. When the slices are removed from the bin or container, this cohesion is not broken any more than necessary. At a result chunks consisting of many folded, overlapped and intertwined wafer thin slices are fed into the screw packing and extruding machine.

These frozen chunks are fed into the spiral screw area through the hopper 17 and manually pressed against the spiral screw. The latter has a splitting action upon the chunks and divisions of the same will fall, some on one side of this shaft and some on the other. The worm 15 by its turning action and frictional resistance against casing 16 exert a twisting force upon the wafer thin slices causing them to spiral and roll into an integrated mass in which the axes of the rolled slices are generally lengthwise of the axes of the casing 16 but slightly angled or spiralled with respect thereto. The twisting of the slices is accomplished without comminuting or tearing or appreciable mutilation of them. They are fed in this condition into the extruding die portion 21 where they are further compacted and fed into tube 22 and extruded therefrom in an extremely solid, integrated and cohesive loaf; the loaf being cut into the desired length for feeding into an automatic pattie cutting machine. It is within the scope of this invention to provide a cutting machine at the mouth of the reduced tube 22 for cutting the meat into marketable sizes. It has been found more practical to cut the meat into relatively long loaves 25 of from eighteen (18″) to thirty six (36″) inches in length and then feed them into a cutting machine for producing patties or cakes of the desired thicknesses. The loaf 25 is so solid that when the final portions are cut therefrom all of the patties or cakes each have the same weight and thickness. The patties or cakes are then packaged and made ready for sale.

We have found that by using an extruding tube of approximately four (4″) inches in diameter a slice of approximately three eighths (⅜″) of an inch thick will weigh approximately two ounces and that four of these slices will make up a good merchandisable package.

It will be seen that from start to finish of this process the meat is maintained in a frozen state, thereby assuring the retention in the meat of all of the natural juices and flavors and reducing spoilage to a point where it is nonexistent.

In Figs. 3 and 4 are shown elevations of the flat side of the finished product. The cut of Fig. 3 has been extruded through a die of circular cross section and the cut of Fig. 4 through a die of rectangular cross section. From these figures it can be seen that by using our process a cut of meat is produced having line graining 30 very similar to that of expensive cuts of meat. These lines represent the cross sectional edging of the cut slices which have been rolled and twisted in the screw machine. It is to be noted that certain grain lines 31 run in one direction while the other grain lines 32 at the other side of the cut run in an opposite direction, but these lines merge as shown. The non-uniform center graining 33 is the result of impressions left in the extruded loaf by the shaft 14. This can be done away with to some extent by the cutting off of the shaft 14 flush with the end edge of the worm. The center portion 33 is of course formed and compacted as the meat is extruded through the die portions 21 and 22.

It will be readily apparent from the foregoing that we have invented a new and useful method of processing meat, and a new and useful meat product having a consistency, appearance and a succulence that has heretofore been impossible to attain.

Various changes in the selection of steps of the method and shaping and formation of the product may be made to the description herein set forth without departing from the spirit of the invention or the scope of the claims.

We claim:

1. A method of treating and providing meat which consists in selecting various cuts of meat in frozen condition, compacting and mold forming the same, wafer thin slicing the molded meat while in frozen condition, and while in such frozen condition circumferentially twisting the slices without substantial individual slice mutilation and compacting the slices into an integrated unitary mass.

2. A method of providing meat which consists in providing wafer thin slices of frozen compacted meat, and without comminuting and individually tearing the slices apart, curve twisting and compressing the same into a compacted mass, and subsequently cutting the mass into sections of desired thickness in planes transverse to the axes of the twisted slices.

3. A method of providing fabricated meat cakes or patties which consists in taking selected cuts of boneless meat, compressing the same while in frozen condition into a mass, wafer thin slicing the mass of meat while in frozen condition, spirally twisting and compacting the wafer thin slices of meat without comminution and appreciable mutilation of the individual slices into a frozen mass, and while still frozen slicing the mass into patties or cakes of desired thickness in planes transverse to the twist axis.

4. In a method of providing a meat product the steps which comprise the production of a block of meat consisting of a plurality of separate pieces of raw meat, and while the block is at freezing temperature slicing relatively thin slices from it and without grinding and substantial mutilation of the individual slices rolling and compacting the same while below freezing temperature into a mass of desired shape and size.

5. The steps in the method of providing a meat product which consists in providing a frozen mass of raw meat the center of which has a freezing temperature, cutting wafer thin slices of meat from said mass and while said wafer thin slices of meat are below freezing temperature rolling and locking together the slices of meat and extruding the same in a loaf shaped frozen compacted form.

6. A process of providing a meat product as defined in claim 5 wherein the temperature range of the mass of frozen meat prior to slicing ranges between 20° F. to 26° F. and wherein the wafer thin slices may vary in slice thickness between 1/128 of an inch to 1/32 of an inch and wherein the spiral twisting and compacting of the wafer thin slices is carried out at a temperature of between 20° F. and 26° F.

7. In a process of producing a meat product the steps which consist in selecting regular cuts of raw meat in frozen condition and while in such frozen condition mold compressing the same into a mass of desired dimensional size under conditions such that the ice crystals formed in the meat will rupture the cell structure of the meat, wafer thin slicing the mass of meat as so formed into slices having substantially the cross sectional area of the mass of meat while the said mass of meat is at a temperature below freezing, spirally twisting bunched slices of said frozen meat and laterally compacting the same and endwise extruding the same under compacted lateral compression into a loaf shaped continuous feed of the meat mass.

8. A method as defined in claim 7 in which the loaf shaped meat mass is subsequently transversely sliced into patties or cakes each of the same cross sectional area as the loaf.

9. In a method of treating and providing a meat product the steps which consist in cutting frozen meat into thin slices while the meat throughout its mass is at a freezing temperature and compressing the slices while still frozen into an elongated unitary loaf in which the slices are relatively spirally positioned with respect to the axis of the loaf without comminuting and appreciable tearing of the individual slices.

10. The steps in the method of treating and providing a raw meat product which consists in compacting raw meat in a unitary mass while the meat is below freezing temperature, slicing the mass of meat while still frozen into very thin slices, and spirally twisting and compressing the slices while still frozen into an integrated mass.

References Cited in the file of this patent
UNITED STATES PATENTS

| | | |
|---|---|---|
| Re. 23,482 | Condon | Apr. 29, 1952 |
| 2,020,843 | Lohner | Nov. 12, 1935 |
| 2,052,221 | Dubil | Aug. 25, 1936 |
| 2,255,796 | Linane et al. | Sept. 16, 1941 |
| 2,298,159 | Plitt et al. | Oct. 6, 1942 |
| 2,527,493 | Condon | Oct. 24, 1950 |